US012761193B2

(12) United States Patent
Masuda et al.

(10) Patent No.: US 12,761,193 B2
(45) Date of Patent: Oct. 13, 2026

(54) ANALYSIS METHOD OF CARBOXYLIC ACID ANHYDRIDE

(71) Applicant: SHIMADZU CORPORATION, Kyoto (JP)

(72) Inventors: Yusuke Masuda, Kyoto (JP); Hidetoshi Terada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 281 days.

(21) Appl. No.: 18/437,259

(22) Filed: Feb. 9, 2024

(65) Prior Publication Data

US 2024/0280550 A1 Aug. 22, 2024

(30) Foreign Application Priority Data

Feb. 10, 2023 (JP) ................................. 2023-019172

(51) Int. Cl.

*B01D 15/40* (2006.01)
*G01N 30/88* (2006.01)
*G01N 30/02* (2006.01)

(52) U.S. Cl.

CPC ............. *G01N 30/88* (2013.01); *B01D 15/40* (2013.01); *G01N 2030/027* (2013.01); *G01N 2030/884* (2013.01)

(58) Field of Classification Search

CPC ................................ B01D 15/26; B01D 15/40
See application file for complete search history.

(56) References Cited

U.S. PATENT DOCUMENTS 8,158,004 B2 * 4/2012 Miyazawa ........... B01D 15/166 210/659
11,071,928 B2 * 7/2021 Shaimi ................. G01N 30/468
2015/0331001 A1 * 11/2015 Jones ...................... C11B 7/005 436/71
2020/0276518 A1 * 9/2020 Rykl ........................ C07K 1/16

FOREIGN PATENT DOCUMENTS

JP S59-024153 A 2/1984
JP 3398212 B2 * 4/2003

OTHER PUBLICATIONS

Sugihara et al., Supercritical Fluid Separation, Analysis Method and Apparatus, Apr. 2003, FIT Machine Translation (Year: 2003).*

* cited by examiner

*Primary Examiner* — Erika J. Villaluna
(74) *Attorney, Agent, or Firm* — Paratus Law Group, PLLC

(57) ABSTRACT

A method for analyzing a sample containing a carboxylic acid anhydride includes, in a stated order, a first step of causing the sample to pass through a column together with a first mobile phase to detect a carboxylic acid anhydride eluted from the column in supercritical fluid chromatography, and a second step of causing a second mobile phase to pass through the column by switching the mobile phase from the first mobile phase to the second mobile phase after a lapse of a retention time of the carboxylic acid anhydride to detect at least one of a carboxylic acid ester and a carboxylic acid eluted from the column. The first mobile phase is a mixture of carbon dioxide and an organic solvent having no hydroxyl group, and the second mobile phase is a mixture of carbon dioxide, an acid, and an organic solvent having a hydroxyl group.

3 Claims, 2 Drawing Sheets

ANALYSIS METHOD OF CARBOXYLIC ACID ANHYDRIDE

CROSS REFERENCE TO RELATED APPLICATIONS

This application claims priority to Japanese Patent Application No. 2023-019172 filed on Feb. 10, 2023, the entire disclosure of which is incorporated by reference herein.

BACKGROUND OF THE INVENTION

Field of the Invention

The present invention relates to an analysis method of a carboxylic acid anhydride.

Description of the Related Art

A carboxylic acid anhydride is used as a raw material for polyimide, polyester, polyamide, or the like, a curing agent for a thermosetting resin, and the like. The carboxylic acid anhydride is a compound (R—CO—O—CO—R') obtained by dehydration condensation of two molecules of carboxylic acid, and reacts with a compound having a hydroxyl group, water, or the like to form an ester or a carboxylic acid.

As a method for analyzing such a carboxylic acid anhydride, liquid chromatography (LC) is employed, and particularly, there are (1) a method by reverse phase LC and (2) a method by normal phase LC. In the method of (1), as a pretreatment, an alcohol, water, or the like is added to a carboxylic acid anhydride to react the carboxylic acid anhydride with a carboxylic acid ester and/or a carboxylic acid (carboxylic acid or the like), and then these are detected by reverse phase LC, thereby indirectly detecting the carboxylic acid anhydride. In the method of (2), the carboxylic acid anhydride is directly detected using an organic solvent having no hydroxyl group as a mobile phase (see, for example, JP-B-S59-24153).

SUMMARY OF THE INVENTION

However, in the method of (1), when the carboxylic acid anhydride and the carboxylic acid or the like are mixed in a sample, the carboxylic acid or the like obtained by the pretreatment and the carboxylic acid or the like originally contained in the sample are eluted and detected at the same time, so that both components cannot be analyzed separately. Also in the method of (2), in the case of the mixed sample, the carboxylic acid anhydride can be analyzed, but the carboxylic acid or the like cannot be analyzed. Therefore, in any of the methods, in the mixed sample of the carboxylic acid anhydride and the carboxylic acid or the like, both components cannot be analyzed simultaneously.

Therefore, an object of the present invention is to provide a method for simultaneously analyzing a carboxylic acid anhydride, and a carboxylic acid ester or a carboxylic acid.

An analysis method of a first aspect of the present invention is a method for analyzing a sample containing a carboxylic acid anhydride, the method including, in a stated order: a first step of causing the sample to pass through a column together with a first mobile phase to detect a carboxylic acid anhydride eluted from the column in supercritical fluid chromatography; and a second step of causing a second mobile phase to pass through the column by switching the mobile phase from the first mobile phase to the second mobile phase after a lapse of a retention time of the carboxylic acid anhydride to detect at least one of a carboxylic acid ester and a carboxylic acid eluted from the column, in which the first mobile phase is a mixture of carbon dioxide and an organic solvent having no hydroxyl group, and the second mobile phase is a mixture of carbon dioxide, an acid, and an organic solvent having a hydroxyl group.

According to the analysis method of the first aspect, it is possible to simultaneously analyze a carboxylic acid anhydride, and a carboxylic acid ester or a carboxylic acid.

DETAILED DESCRIPTION OF THE PREFERRED EMBODIMENT

1. First Embodiment

An analysis method of a first embodiment of the present invention is a method for analyzing a carboxylic acid anhydride and a carboxylic acid ester or a carboxylic acid by supercritical fluid chromatography, the method including a preparation step, a first step, and a second step in this order. Hereinafter, each step will be described in detail.

Preparation Step

In this step, provision is made for a sample to be analyzed by supercritical fluid chromatography (SFC).

The sample to be used may contain a carboxylic acid anhydride, but in the first embodiment, when the sample is a mixture containing a carboxylic acid ester and/or a carboxylic acid (hereinafter, also referred to as "carboxylic acid or the like") in addition to the carboxylic acid anhydride, these components can be simultaneously detected, and thus it is preferable to use a mixture containing these components as the sample. The carboxylic acid ester may be a dicarboxylic acid diester or a dicarboxylic acid monoester. The carboxylic acid may be a monocarboxylic acid or a dicarboxylic acid.

The carboxylic acid moiety of the carboxylic acid anhydride and the carboxylic acid moiety of the carboxylic acid or the like may be the same or different. That is, when the sample contains a biphthalic acid anhydride as the carboxylic acid anhydride, the sample may contain a biphthalic acid ester or a biphthalic acid as the carboxylic acid or the like, and may contain another carboxylic acid or the like (for example, an oxydiphthalic acid ester or an oxyphthalic acid). In the first embodiment, even when a sample in which carboxylic acid moieties are the same is contained, or even when a sample in which carboxylic acid moieties are different from each other is contained, these can be analyzed simultaneously. The sample may contain a plurality of different carboxylic acid anhydrides and/or carboxylic acids or the like. In this case, the plurality of carboxylic acid anhydrides and/or carboxylic acids or the like may be structural isomers or optical isomers.

SFC is chromatography in which a sample is separated using a supercritical fluid as a mobile phase. That is, the substance of the mobile phase is brought into a supercritical state, and the sample is passed through and eluted from a column (stationary phase) together with the mobile phase, thereby separating the sample. Note that the main substance of the mobile phase, that is, carbon dioxide is usually carried out in a supercritical state, but may be in a subcritical state without reaching the supercritical state.

Figure 1:
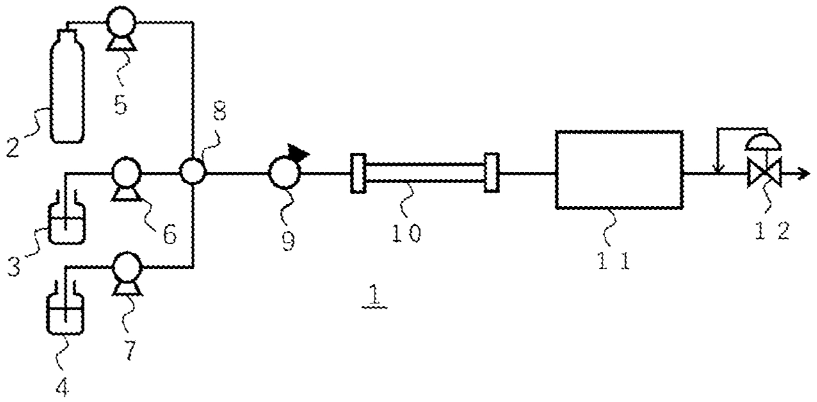
FIG. 1 is a schematic diagram of an example of a supercritical fluid chromatograph device used in a first embodiment.

A known or commercially available device may be prepared as a device used for the SFC, and a schematic diagram of an example thereof is illustrated in FIG. 1. An SFC device 1 illustrated in FIG. 1 includes at least a mobile phase container 2, a first modifier container 3, a second modifier container 4, a plurality of pumps 5 to 7, a mixing unit 8, a sample introduction unit 9, a column 10, a detection unit 11, and a back-pressure control unit 12. Although not illustrated, the SFC device 1 includes another unit that enables SFC, such as a heating unit, and may additionally include a makeup solvent container, a mass spectrometer, and the like.

The mobile phase container 2 contains carbon dioxide for achieving a supercritical state. Specifically, a carbon dioxide cylinder is used as the mobile phase container 2.

The first modifier container 3 contains an organic solvent having no hydroxyl group. This makes it possible to suppress hydrolysis or the like of the carboxylic acid anhydride and to improve the separation and elution performance. Examples of the organic solvent having no hydroxyl group (hereinafter, also referred to as "non-hydroxylic solvent") include acetonitrile, acetone, tetrahydrofuran, hexane, isooctane, 4-dioxane, ethyl acetate, dichloromethane, chloroform, dimethylformamide, and dimethylsulfoxide, and acetonitrile is preferable. These may be used singly or in combination of two or more kinds thereof.

The second modifier container 4 contains a mixed solvent of an acid and an organic solvent having a hydroxyl group. By using such a mixed solvent, the elution power of the carboxylic acid or the like with respect to the mobile phase can be enhanced. Examples of the acid include phosphoric acid, formic acid, acetic acid, and trifluoroacetic acid. These may be used singly or in combination of two or more kinds thereof. From the viewpoint of efficiently eluting the carboxylic acid or the like from the column, phosphoric acid or formic acid is preferable, and phosphoric acid is more preferable. Examples of the organic solvent having a hydroxyl group (hereinafter, also referred to as "hydroxylic solvent") include methanol, ethanol, and 2-propanol, and methanol or ethanol is preferable. These may be used singly or in combination of two or more kinds thereof. The concentration of the acid in the mixed solvent is, for example, 0.01 (v/v) % or more and preferably 0.1 (v/v) % or more, and is, for example, 10 (v/v) % or less and preferably 5 (v/v) % or less. The second modifier container 4 may be configured as a plurality of containers, and each of the containers may individually contain an acid or a hydroxylic solvent. That is, the components may be prepared in the form of a mixed solvent before analysis, or the components may be sucked and mixed from individual containers at the time of analysis to prepare a mixed solvent.

The plurality of pumps 5 to 7 are the pump 5 for feeding carbon dioxide in the mobile phase container 2, the pump 6 for feeding a solvent in the first modifier container 3, and the pump 7 for feeding a solvent in the second modifier container 4. Each pump is provided with a valve (not illustrated) and can individually adjust a mobile phase component to be fed to the column 10. On pump may be used both as the pumps 6 and 7 for a modifier.

The sample introduction unit (automatic sampler) 9 is a unit for injecting a desired amount of a sample into a path of a mobile phase and introducing the sample into a column together with the mobile phase, and the sample is charged in the sample introduction unit.

The stationary phase disposed in the column 10 may be any phase as long as it can retain or separate both the carboxylic acid anhydride and the carboxylic acid or the like, and the stationary phase is appropriately determined according to a sample such as the carboxylic acid anhydride. Examples of such a stationary phase includes a carrier having a functional group or a carrier having no functionality. Examples of the functional group include an octadecylsilyl group, a polybutylene terephthalate group, a pentapromobenzyl group, a poly(4-vinylpyridine) group, a diol group, a 3-hydroxyphenyl group, a carbamoyl group, and a cholesteryl group. A polybutylene terephthalate group and a pentapromobenzyl group are preferable, and a polybutylene terephthalate group is more preferable. This makes it possible to retain and separate the carboxylic acid anhydride and retain the carboxylic acid or the like in the first step and to reliably separate the carboxylic acid or the like in the second step.

Examples of the carrier having a modified functional group include silica beads, acrylic beads, and agarose-based beads.

Examples of the column including such a stationary phase include Shim-pack US series (registered trademark) manufactured by SHIMADZU CORPORATION, CHIRAL PAK series (registered trademark) manufactured by Daicel Corporation, and Cellulose-C series manufactured by YMC Co., Ltd.

The detection unit 11 is a device that detects the carboxylic acid anhydride and the carboxylic acid or the like eluted from the column, and examples thereof include an ultraviolet visible light detector, a photodiode array detector, and an evaporation light scattering detector.

First Step

In this step, the sample is subjected to SFC. Specifically, the sample is caused to pass through a column together with a first mobile phase to detect a carboxylic acid anhydride eluted from the column.

As the mobile phase (first mobile phase) used in the first step of the first embodiment, a mixture of carbon dioxide and a non-hydroxylic solvent is used. Carbon dioxide is a main component that becomes a supercritical state as a mobile phase. The non-hydroxylic solvent adjusts the solubility in the mobile phase in the measurement sample. In the first step, by mixing such a non-hydroxylic solvent with carbon dioxide, hydrolysis, esterification, and the like of the carboxylic acid anhydride can be prevented, and the carboxylic acid anhydride can be eluted after being retained and separated on the stationary phase of the column. In addition, the carboxylic acid ester and the carboxylic acid can remain retained on the stationary phase of the column.

Specifically, by operating the pump 5 of the mobile phase container 2 and the pump 6 of the first modifier container 3, carbon dioxide and a non-hydroxylic solvent are mixed in the mixing unit 8, and by adjusting the temperature and pressure in the SFC device 1, the carbon dioxide is brought into a supercritical state. Thereafter, the first mobile phase, which is a mixed fluid containing supercritical carbon dioxide and a non-hydroxylic solvent, is mixed with the sample from the sample introduction unit 9, and then the mixture is sent to the column 10. In the column 10, the carboxylic acid anhydride in the sample is retained in the stationary phase of the column 10 for a certain period of time, and then eluted from the column together with the first mobile phase. The carboxylic acid anhydride eluted from the column 10 is detected by the detection unit 11 and output as a peak of a chromatogram. When a plurality of carboxylic acid anhydrides are contained in the sample, the sample is retained on the column 10 according to the carboxylic acid anhydrides, eluted at each retention time, and output as separated peaks in a chromatogram. On the other hand, the carboxylic acid or the like in the sample is continuously retained on the stationary phase of the column 10, and is not eluted from the column 10 during the first step.

The retention time of the carboxylic acid anhydride is appropriately determined according to the type of the carboxylic acid anhydride and the stationary phase, and is, for example, 2 minutes or longer and preferably 3 minutes or longer, and is, for example, 15 minutes or shorter, preferably 12 minutes or shorter, and more preferably 8 minutes or shorter.

The mixing ratio of the non-hydroxylic solvent in the first mobile phase is, for example, 3 (v/v) % or more and preferably 5 (v/v) % or more, and is, for example, 30 (v/v) % or less and preferably 20 (v/v) % or less.

The column temperature, the back pressure, the temperature thereof (BPR pressure, BPR temperature), and the like may be appropriately adjusted according to the built-in conditions of the SFC device.

Second Step

In this step, after a lapse of a retention time of the carboxylic acid anhydride, the mobile phase is switched from the first mobile phase to a second mobile phase. Thus, the second mobile phase is caused to pass through the column, and the carboxylic acid and the like eluted from the column can be detected.

That is, after the retention period elapses, a substance to be mixed with carbon dioxide is changed from the non-hydroxylic solvent contained in the first modifier container 3 to the mixed solvent contained in the second modifier container 4. As a result, the second mobile phase fed to the column becomes a mixture of supercritical carbon dioxide, an acid, and a hydroxylic solvent.

Specifically, by operating the pump 7 of the second modifier container 4 and switching the built-in valves of the pumps 6 and 7, feeding of the non-hydroxylic solvent from the first modifier container 3 is stopped, and feeding of the mixed solvent from the second modifier container 4 is started. As a result, the carbon dioxide and the mixed solvent are mixed in the mixing unit 8, and the second mobile phase, which is a mixed fluid containing supercritical carbon dioxide, an acid, a hydroxylic solvent, is obtained. When this second mobile phase passes through the column 10, the carboxylic acid or the like retained on the stationary phase of the column 10 is dissolved in the second mobile phase, eluted from the column 10 together with the second mobile phase, and detected by the detection unit 11.

The switching time of the mobile phase is after the lapse of the retention period of the carboxylic acid anhydride, and for example, switching may be performed at a time point of 5 minutes or longer and 30 minutes or shorter, preferably at a time point of 6 minutes or longer and 15 minutes or shorter, and more preferably at a time point of 8 minutes or longer and 12 minutes or shorter, based on the start of the first step.

The retention time of the carboxylic acid or the like is appropriately determined according to the type of the carboxylic acid or the like and the stationary phase, and is, for example, 5 minutes or longer and preferably 15 minutes or longer, and is, for example, 90 minutes or shorter and preferably 50 minutes or shorter, based on the time of switching (the start of the second Step).

The mixing ratio of the mixed solvent in the second mobile phase is, for example, 3 (v/v) % or more and preferably 5 (v/v) % or more, and is, for example, 30 (v/v) % or less and preferably 20 (v/v) % or less.

The column temperature, the back pressure, the temperature thereof (BPR pressure, BPR temperature), and the like may be continuously performed under the same conditions as in the first step.

According to this method, the carboxylic acid anhydride and the carboxylic acid or the like can be detected by separating the components in a sample liquid for each time, and thus the mixture of the carboxylic acid anhydride and the carboxylic acid ester or the like can be simultaneously detected. In particular, the carboxylic acid anhydride and an esterified product and/or hydrolysate of the carboxylic acid anhydride (preferably, a hydrolysate of the carboxylic acid anhydride) can be simultaneously detected. According to this method, analysis can be easily performed only by switching the mobile phase, that is, switching the liquid feeding from the first modifier container 3 and the liquid feeding from the second modifier container 4 without replacing the stationary phase of the column. The carboxylic acid anhydride and the carboxylic acid or the like having unknown contents can be quantified by subjecting the carboxylic acid anhydride and the carboxylic acid or the like having known contents to the SFC to create a calibration curve.

The first mobile phase may contain other additives in addition to carbon dioxide and the non-hydroxylic solvent, but does not substantially contain a hydroxylic solvent. The second mobile phase may contain other additives in addition to carbon dioxide, the acid, the hydroxylic solvent. In this case, various additives may be mixed in the first modifier container 3 and the second modifier container 4, or other modifier containers may be prepared and various additives may be mixed in the mixing unit 8 or upstream thereof.

2. Aspects

It is understood by those skilled in the art that the exemplary embodiment described above is a specific example of the following aspects.

(Item 1) A method for analyzing a carboxylic acid anhydride according to an aspect is a method for analyzing a sample containing a carboxylic acid anhydride, the method including, in a stated order: a first step of causing the sample to pass through a column together with a first mobile phase to detect a carboxylic acid anhydride eluted from the column in supercritical fluid chromatography; and a second step of causing a second mobile phase to pass through the column by switching the mobile phase from the first mobile phase to the second mobile phase after a lapse of a retention time of the carboxylic acid anhydride to detect at least one of a carboxylic acid ester and a carboxylic acid eluted from the column, in which the first mobile phase may be a mixture of carbon dioxide and an organic solvent having no hydroxyl group, and the second mobile phase may be a mixture of carbon dioxide, an acid, and an organic solvent having a hydroxyl group.

(Item 2) In the analysis method according to Item 1, the acid may be phosphoric acid or formic acid.

(Item 3) In the analysis method according to Item 1 or 2, the organic solvent having no hydroxyl group may be acetonitrile, and the organic solvent having a hydroxyl group may be methanol or ethanol.

EXAMPLES

The present invention will be described in detail with reference to Examples; however, the scope of the present invention is not limited thereto.

Example 1

Four kinds of mixed samples obtained by mixing 50 mg/L of each of two kinds of isomers (s-BPDA and a-BPDA) of biphthalic acid anhydride and two kinds of isomers (ODPA-C and a-ODPA) of oxydiphthalic acid anhydride shown below were prepared as Sample A. These hydrolysates, that is, four kinds of mixed samples obtained by mixing 50 mg/L of each of two kinds of isomers of biphthalic acid and two kinds of isomers of oxydiphthalic acid were prepared as Sample B. A mobile phase container was filled with carbon dioxide as Mobile phase A. As Mobile phase B, a first modifier container was filled with acetonitrile and a second modifier container was filled with a 0.1% phosphoric acid methanol solution. Each of Samples A and B was subjected to SFC analysis under the following conditions. For the analysis, for Mobile phase B to be mixed with Mobile phase A, acetonitrile was selected at the start time point, and 8 minutes after the start, acetonitrile was switched to a phosphoric acid methanol solution.

[Formula 1]

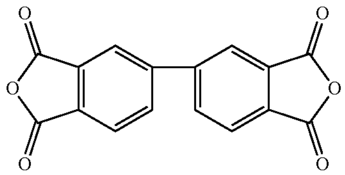

s-BPDA

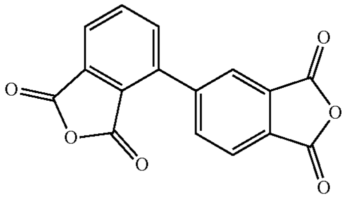

a-BPDA

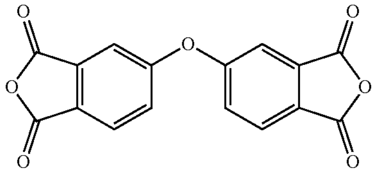

ODPA-C

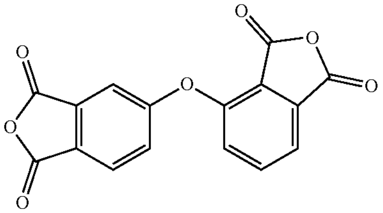

a-ODPA

Device name: Nexera US (supercritical fluid chromatograph system, manufactured by SHIMADZU CORPORATION)

Column: Shim-pack UC-PolyBT (250 mm×4.6 mm I.D., 5 μm) (stationary phase having a polybutylene terephthalate group)

Mobile phase A: $CO_2$

Mobile phase B: acetonitrile (0 to 8 minutes)

Mobile phase B: 0.1% phosphoric acid methanol solution (8 to 50 minutes)

Flow rate: 3.0 mL/min

Time program: B concentration 10% (0 to 8 minutes), 5% (8 to 50 minutes)

Column temperature: 40° ° C.

BPR pressure: 15 MPa

BPR temperature: 50° ° C.

Detection: 250 to 300 nm (photodiode array with high-pressure flow cell)

Injection volume: 2 μL (in acetonitrile)

Vial: SHIMADZU Lab Total for LC 1.5 ml, Glass

Figure 2:
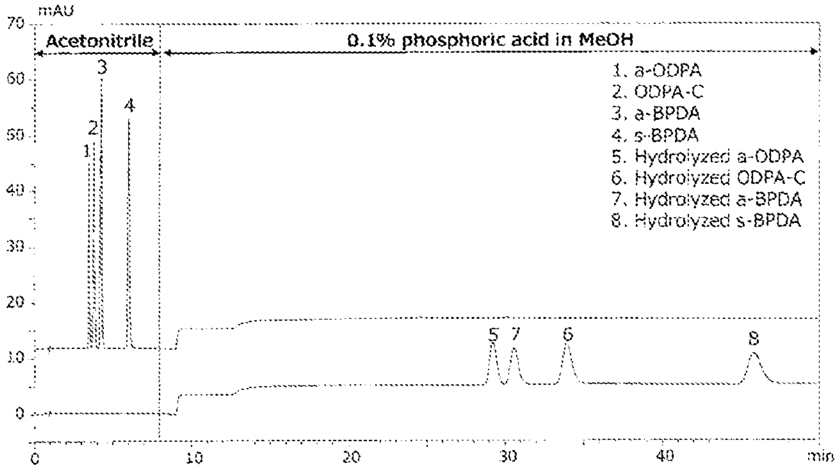
FIG. 2 shows a liquid chromatogram obtained by measurement in Example 1.

The chromatogram of Sample A and Sample B obtained at this time is collectively shown in FIG. 2. As is clear from FIG. 2, the peak of the carboxylic acid anhydride appears before the switching of Mobile phase B (retention time: 3 to 7 minutes), and the peak of the hydrolysate thereof (dicarboxylic acid) appears after the switching of Mobile phase B (retention time: 28 to 47 minutes). Therefore, it is found that this analysis method can simultaneously analyze the carboxylic acid anhydride and the hydrolysate thereof.

The same measurement as the above measurement was repeated six times, and the reproducibility of each peak area was measured. The results are shown in the following table. Since the standard deviation was 1.1% or less in all peaks, it was found that the sample had very high reproducibility and could be quantitatively analyzed with high accuracy. For Sample A and Sample B, mixed samples in which the concentrations were changed to 5 mg/L, 10 mg/L, 25 mg/L, and 125 mg/L were also prepared, the same analysis was performed, and a calibration curve of each sample (four kinds, that is, s-BPDA, a-BPDA, DPA-C, and a-ODPA) was created. As a result, it was shown that the contribution ratio ($R^2$) of any calibration curve was 0.999 or more, and the accuracy of quantification was excellent.

TABLE 1

| Peak No. | Sample | Relative standard deviation(% RSD) |
|---|---|---|
| 1 | a-ODPA | 0.68 |
| 2 | ODPA-C | 0.84 |
| 3 | a-BPDA | 0.85 |
| 4 | s-BPDA | 0.93 |
| 5 | Hydrolysate of a-ODPA | 0.67 |
| 6 | Hydrolysate of ODPA-C | 0.62 |
| 7 | Hydrolysate of a-BPDA | 0.88 |
| 8 | Hydrolysate of s-BPDA | 1.08 |

What is claimed is:

1. A method for analyzing a sample containing a carboxylic acid anhydride, the method comprising, in a stated order:

a first step of causing the sample to pass through a column together with a first mobile phase to detect a carboxylic acid anhydride eluted from the column in supercritical fluid chromatography; and a second step of causing a second mobile phase to pass through the column by switching the mobile phase from the first mobile phase to the second mobile phase after a lapse of a retention time of the carboxylic acid anhydride to detect at least one of a carboxylic acid ester and a carboxylic acid eluted from the column, wherein the first mobile phase is a mixture of carbon dioxide and an organic solvent having no hydroxyl group, and the second mobile phase is a mixture of carbon dioxide, an acid, and an organic solvent having a hydroxyl group.

2. The method according to claim 1, wherein the acid is phosphoric acid or formic acid.

3. The method according to claim 1, wherein the organic solvent having no hydroxyl group is acetonitrile, and the organic solvent having a hydroxyl group is methanol or ethanol.

* * * * *